(12) United States Patent
Russo et al.

(10) Patent No.: US 12,190,652 B2
(45) Date of Patent: *Jan. 7, 2025

(54) SYSTEMS AND METHODS FOR INCENTIVIZING USE OF SAFETY DEVICE

(71) Applicant: QUANATA, LLC, San Francisco, CA (US)

(72) Inventors: Micah Wind Russo, Oakland, CA (US); Theobolt N. Leung, San Francisco, CA (US); Gareth Finucane, San Francisco, CA (US); Eric Dahl, Newman Lake, WA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,769

(22) Filed: Sep. 22, 2023

(65) Prior Publication Data

US 2024/0013590 A1   Jan. 11, 2024

Related U.S. Application Data

(63) Continuation of application No. 17/484,037, filed on Sep. 24, 2021, now Pat. No. 11,810,408, which is a continuation of application No. 16/203,271, filed on Nov. 28, 2018, now Pat. No. 11,170,587.

(51) Int. Cl.
*G07C 5/02* (2006.01)
*B60R 22/48* (2006.01)

(52) U.S. Cl.
CPC ............... *G07C 5/02* (2013.01); *B60R 22/48* (2013.01)

(58) Field of Classification Search
CPC .......... G07C 5/02; G07C 5/008; B60R 22/48; G08B 21/24; G06Q 10/10
See application file for complete search history.

(56) References Cited

U.S. PATENT DOCUMENTS

| | | | |
|---|---|---|---|
| 6,204,757 B1 * | 3/2001 | Evans | B60R 22/48 340/439 |
| 7,626,495 B2 | 12/2009 | Montague | |
| 9,427,039 B2 | 8/2016 | Eustace | |
| 9,477,639 B2 | 10/2016 | Fischer et al. | |
| 9,665,910 B2 | 5/2017 | Chalfant et al. | |
| 9,872,225 B2 | 1/2018 | Guba et al. | |
| 9,892,573 B1 | 2/2018 | Hsu-hoffman et al. | |

(Continued)

*Primary Examiner* — Toan N Pham
(74) *Attorney, Agent, or Firm* — BRYAN CAVE LEIGHTON PAISNER LLP

(57) ABSTRACT

Systems and methods of incentivizing the use of a safety device while operating a vehicle are provided. Data captured by sensors associated with a safety device may be analyzed to identify instances in which the safety device is used by an operator of a vehicle. Additionally, data captured by sensors associated with the vehicle may be analyzed to identify instances in which the vehicle is in motion. By comparing the instances in which the safety device is used by the operator of the vehicle to the instances in which the vehicle is in motion, instances in which the operator of the vehicle uses the safety device while operating the vehicle may be determined. Furthermore, a trend of the operator of the vehicle using the safety device while operating the vehicle may be identified. A notification related to the identified trend may be provided to the operator of the vehicle.

21 Claims, 4 Drawing Sheets

(56) References Cited

U.S. PATENT DOCUMENTS

| | | |
|---|---|---|
| 9,979,813 B2 | 5/2018 | Pandurangarao |
| 10,783,587 B1 | 9/2020 | Augustine et al. |
| 11,170,587 B1 | 11/2021 | Russo et al. |
| 2011/0074566 A1* | 3/2011 | Rao ..................... B60R 22/48 |
| | | 340/457.1 |
| 2012/0123906 A1 | 5/2012 | Cirulli et al. |
| 2012/0135382 A1 | 5/2012 | Winston et al. |
| 2015/0025917 A1 | 1/2015 | Stempora |
| 2016/0055509 A1 | 2/2016 | Nyberg et al. |
| 2017/0150360 A1 | 5/2017 | Caldwell et al. |
| 2018/0012470 A1 | 1/2018 | Kritzler et al. |
| 2018/0211345 A1* | 7/2018 | Bean ..................... G01S 11/06 |

* cited by examiner

SYSTEMS AND METHODS FOR INCENTIVIZING USE OF SAFETY DEVICE

CROSS-REFERENCE TO RELATED APPLICATIONS

This application is a continuation of U.S. patent application Ser. No. 17/484,037, filed Sep. 24, 2021, which is a continuation of, and claims the benefit of U.S. patent application Ser. No. 16/203,271, filed Nov. 28, 2018, the entire disclosures of which are hereby expressly incorporated by reference herein in their entirety.

FIELD OF THE DISCLOSURE

The present disclosure generally relates to vehicle safety and, more particularly, to incentivizing the use of a safety device while operating a vehicle.

BACKGROUND

Operating a vehicle is an inherently dangerous activity. In many cases, vehicle operators may mitigate some of the risks of operating a vehicle by using safety devices, such as, e.g., seatbelts, safety helmets, life jackets, etc. However, some vehicle operators do not use safety devices every time they operate a vehicle.

SUMMARY

In one aspect, a computer-implemented method of incentivizing the use of a safety device while operating a vehicle is provided. The method comprises: analyzing, by a processor, data captured by a sensor associated with a safety device to identify instances in which the safety device is used by an operator of a vehicle; analyzing, by a processor, data captured by sensors associated with the vehicle to identify instances in which the vehicle is in motion; comparing, by a processor, the instances in which the safety device is used by the operator of the vehicle to the instances in which the vehicle is in motion to determine instances in which the operator of the vehicle is using the safety device while operating the vehicle; identifying, by a processor, based on the comparing, a trend of the operator of the vehicle using the safety device while operating the vehicle; and providing, by a processor, to the operator of the vehicle, a notification related to the identified trend of the operator of the vehicle using the safety device while operating the vehicle.

In another aspect, a computer system for incentivizing the use of a safety device while operating a vehicle is provided. The computer system comprises one or more processors and one or more memories storing instructions. The instructions, when executed by the one or more processors, cause the computer system to: analyze data captured by a sensor associated with a safety device to identify instances in which the safety device is used by an operator of a vehicle; analyze data captured by sensors associated with the vehicle to identify instances in which the vehicle is in motion; compare the instances in which the safety device is used by the operator of the vehicle to the instances in which the vehicle is in motion to determine instances in which the operator of the vehicle uses the safety device while operating the vehicle; identify, based on the comparing, a trend of the operator of the vehicle using the safety device while operating the vehicle; and provide, to the operator of the vehicle, a notification related to the identified trend of the operator of the vehicle using the safety device while operating the vehicle.

In still another aspect, a computer-readable storage medium having stored thereon a set of instructions for incentivizing the use of a safety device while operating a vehicle is provided. The instructions are executable by a processor, and comprise instructions for: analyzing data captured by a sensor associated with a safety device to identify instances in which the safety device is used by an operator of a vehicle; analyzing data captured by sensors associated with the vehicle to identify instances in which the vehicle is in motion; comparing the instances in which the safety device is used by the operator of the vehicle to the instances in which the vehicle is in motion to determine instances in which the operator of the vehicle uses the safety device while operating the vehicle; identifying, based on the comparing, a trend of the operator of the vehicle using the safety device while operating the vehicle; and providing, to the operator of the vehicle, a notification related to the identified trend of the operator of the vehicle using the safety device while operating the vehicle.

DETAILED DESCRIPTION

Figure 1A:
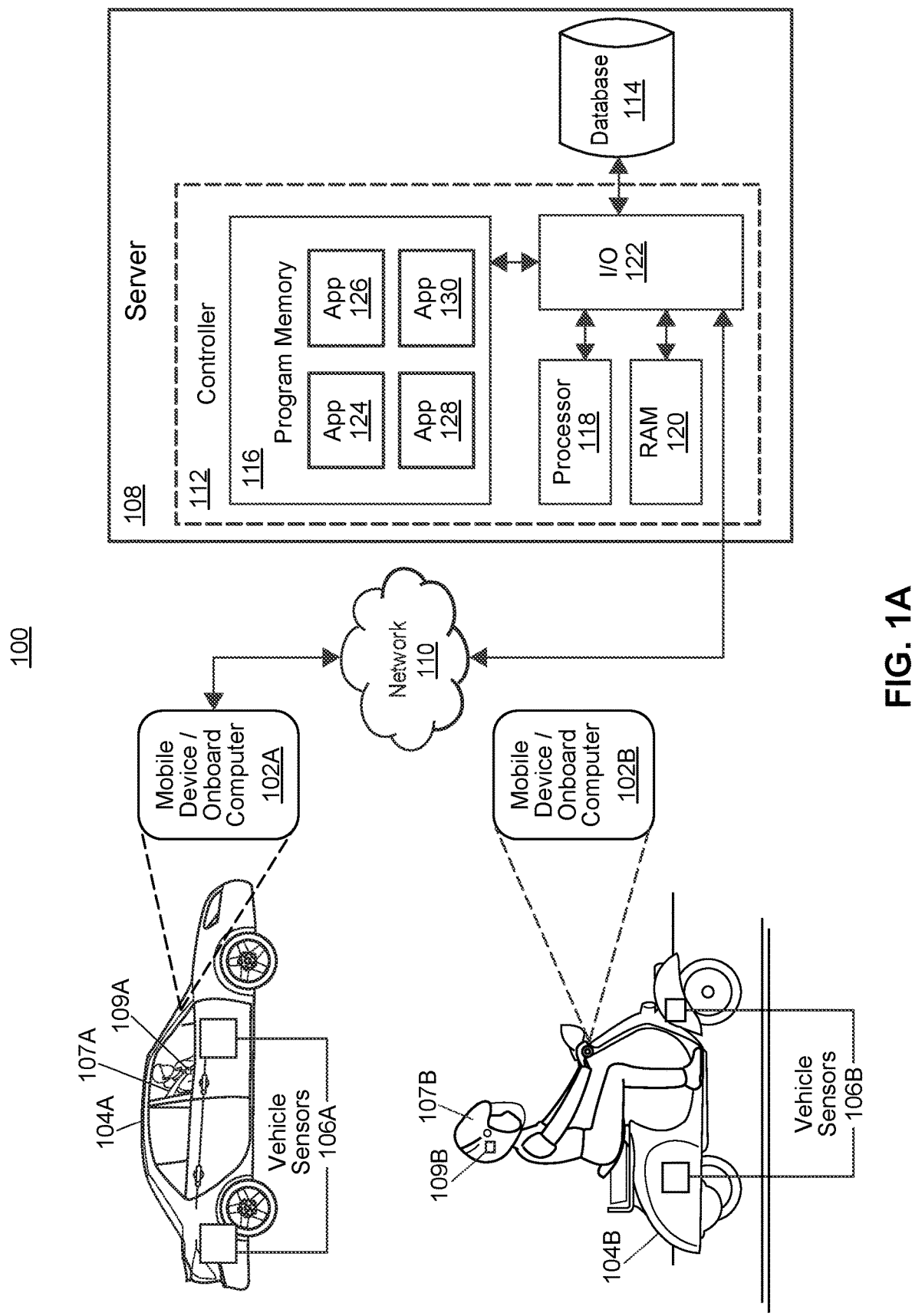
FIG. 1A illustrates an exemplary computer system for of incentivizing the use of a safety device while operating a vehicle, in accordance with some embodiments.

Operating a vehicle is an inherently dangerous activity. In many cases, vehicle operators may mitigate some of the risks of operating a vehicle by using safety devices, such as, e.g., seatbelts, safety helmets, life jackets, etc. However, some vehicle operators do not use safety devices every time they operate a vehicle. Systems and methods for incentivizing the use of a safety device while operating a vehicle are provided herein.

A vehicle safety device (e.g., a helmet, a seat belt, a life jacket, etc.) may be equipped with sensors configured to detect when the device is being used and/or worn. The sensors may transmit data indicating use of the safety device to a computing device. Data indicating use of the vehicle (e.g., a car, truck, motorcycle, motorized scooter, boat, etc.) may also be transmitted to the computing device. The data indicating the use of the vehicle may include, e.g., vehicle telematics data captured by sensors within the vehicle (e.g., attached to the vehicle, or part of a mobile device within the vehicle). The safety device and vehicle use data may include time stamps associated with each use. Based on the timing of the safety device use data and the vehicle use data, the computing device may identify the frequency and/or consistency of safety device use.

For example, the computing device may determine that a user uses a helmet every time she rides her motorcycle, or 75% of the time, or 50% of the time, etc. In another example, the computing device may determine that a user has worn a seat belt for the last five car trips, or ten car trips, or some other "streak." As another example, the percentage of time the safety device is used may contribute to a user's score, which may be compared against other users' scores (e.g., on a leaderboard). In some instance, a user may earn incentives based on achieving certain scores. In some instances, incentives may be monetary amounts, discounts (e.g., insurance discounts, third party discounts, etc.), etc. In other instances, the incentives may be linked to the safety device itself. For example, after achieving a certain streak, a user may "unlock" an elite helmet with different features or a different look (e.g., physically receive a new helmet). For instance, a user may first use a "silver" helmet, then eventually unlock a "gold" or "platinum" helmet. Users with certain helmet types may receive other privileges, such as invitations to certain VIP events, or ability to rent preferable vehicles.

Specifically, in one example, data captured by sensors associated with a safety device may be analyzed to identify instances in which the safety device is being worn by an operator of a vehicle. Additionally, data captured by sensors associated with the vehicle may be analyzed to identify instances in which the vehicle is in motion. By comparing the instances in which the safety device is being worn by the operator of the vehicle to the instances in which the vehicle is in motion, instances in which the operator of the vehicle is wearing the safety device while operating the vehicle may be determined. Furthermore, a trend of the operator of the vehicle wearing the safety device while operating the vehicle may be identified. A notification related to the identified trend may be provided to the operator of the vehicle.

Referring now to FIG. 1A, an exemplary computer system 100 for incentivizing the use of a safety device while operating a vehicle is illustrated, in accordance with some embodiments. The high-level architecture illustrated in FIG. 1A may include both hardware and software applications, as well as various data communications channels for communicating data between the various hardware and software components, as is described below.

As shown in FIG. 1A, mobile devices and/or on-board computers 102A, 102B (shown in greater detail at FIG. 1B) associated with vehicles 104A, 104B may interface with vehicle sensors 106A, 106B, which may capture vehicle telematics data and other suitable data associated with the vehicle 104A, 104B. As shown in FIG. 1A, vehicle 104A is a car, while vehicle 104B is a motorized scooter, but in various embodiments, vehicles may additionally include other types of vehicles, such as, e.g., boats, trucks, motorcycles, etc. In many instances, the use of safety devices, such a seatbelt 107A a safety helmet 107B, a life jacket (not shown), etc., may be recommended or required by law during the operation of certain types of vehicles. As shown in FIG. 1A, the safety devices 107A, 107B include respective sensors 109A, 109B. The mobile devices and/or on-board computers 102A, 102B may further interface with the sensors 109A, 109B. The mobile device and/or on-board computer 102A, 102B may be configured to communicate the captured sensor data from vehicle sensors 106A, 106B and safety device sensors 109A, 109B to a server 108 via a network 110.

By analyzing the data captured by the safety device sensors 109a, 109B, the server 108 may identify instances in which an operator of a vehicle 104A, 104B is wearing his or her safety device 107A, 107B. Furthermore, by analyzing the data captured by the vehicle sensors 106A, 106B, the server 108 may identify instances in which the vehicle 104A, 104B is in motion. Additionally, the server 108 may compare the instances in which the safety device 107A, 107B is being worn by the operator of the vehicle 104A, 104B to the instances in which the vehicle 104A, 104B is in motion to determine instances in which the operator of the vehicle 104A, 104B is wearing the safety device 107A, 107B while operating the vehicle 104A, 104B. Based on the comparison, the server 108 may identify one or more trends of the vehicle operator wearing the safety device while operating the vehicle 104A, 104B. Based on identified trends, the server 108 may generate notifications for the vehicle operator, e.g., indicating a reward that the operator has earned by wearing his or her safety device while operating his or her vehicle.

As shown in FIG. 1A, the server 108 may include a controller 112 that may be operatively connected to the one or more databases 114 via a link, which may be a local or a remote link. The one or more databases 114 may be adapted to store data related to, for instance, various types of safety devices, vehicle operator trends associated with the vehicle operator and/or with other vehicle operators, various rewards that may be granted to vehicle operators, various types of activities that may earn rewards, etc. It should be noted that, while not shown, additional databases may be linked to the controller 112. Additionally, separate databases may be used for various types of information, in some instances. Additional databases (not shown) may be communicatively connected to the server 108 via the network 110.

The controller 112 may include one or more program memories 116, one or more processors 118 (which may be, e.g., microcontrollers and/or microprocessors), one or more random-access memories (RAMs) 120, and an input/output (I/O) circuit 122, all of which may be interconnected via an address/data bus. Although the I/O circuit 122 is shown as a single block, it should be appreciated that the I/O circuit 122 may include a number of different types of I/O circuits. The program memory 116 and RAM 120 may be implemented as semiconductor memories, magnetically readable memories, optically readable memories, or biologically readable memories, for example. Generally speaking, the program memory 116 and/or the RAM 120 may respectively include one or more non-transitory, computer-readable storage media. The controller 112 may also be operatively connected to the network 110 via a link.

The server 108 may further include a number of various software applications 124, 126, 128, 130 stored in the program memory 116. Generally speaking, the applications may perform one or more functions related to, inter alia, analyzing data captured by a sensor associated with a safety device to identify instances in which the safety device is being worn by an operator of a vehicle, analyzing data captured by sensors associated with the vehicle to identify instances in which the vehicle is in motion, comparing the instances in which the safety device is being worn by the operator of the vehicle to the instances in which the vehicle is in motion to determine instances in which the operator of the vehicle is wearing the safety device while operating the vehicle, identifying, based on the comparing, a trend of the operator of the vehicle wearing the safety device while operating the vehicle, calculating a safety score associated with the operator of the vehicle, generating a notification related to the identified trend of the operator of the vehicle wearing the safety device while operating the vehicle, etc. For example, one or more of the applications 124, 126, 128, 130 may perform at least a portion of any of the method 300 shown in FIG. 3. The various software applications 124, 126, 128, 130 may be executed on the same processor 126 or on different processors. Although four software applications 124, 126, 128, 130 are shown in FIG. 1A, it will be understood that there may be any number of software applications 124, 126, 128, 130. Further, two or more of the various applications 124, 126, 128, 130 may be integrated as an integral application, if desired.

It should be appreciated that although the server 108 is illustrated as a single device in FIG. 1A, one or more portions of the server 108 may be implemented as one or more storage devices that are physically co-located with the server 108, or as one or more storage devices utilizing different storage locations as a shared database structure (e.g. cloud storage). In some embodiments, the server 108 may be configured to perform any suitable portion of the processing functions remotely that have been outsourced by the on-board computer and/or mobile device 102A, 102B. Moreover, in some embodiments, one or more processing functions described as being performed by the server 108 may be performed by a computing device (not shown) located on or inside of (or otherwise associated with) a safety device, such as safety device 107A or safety device 107B.

Figure 1B:
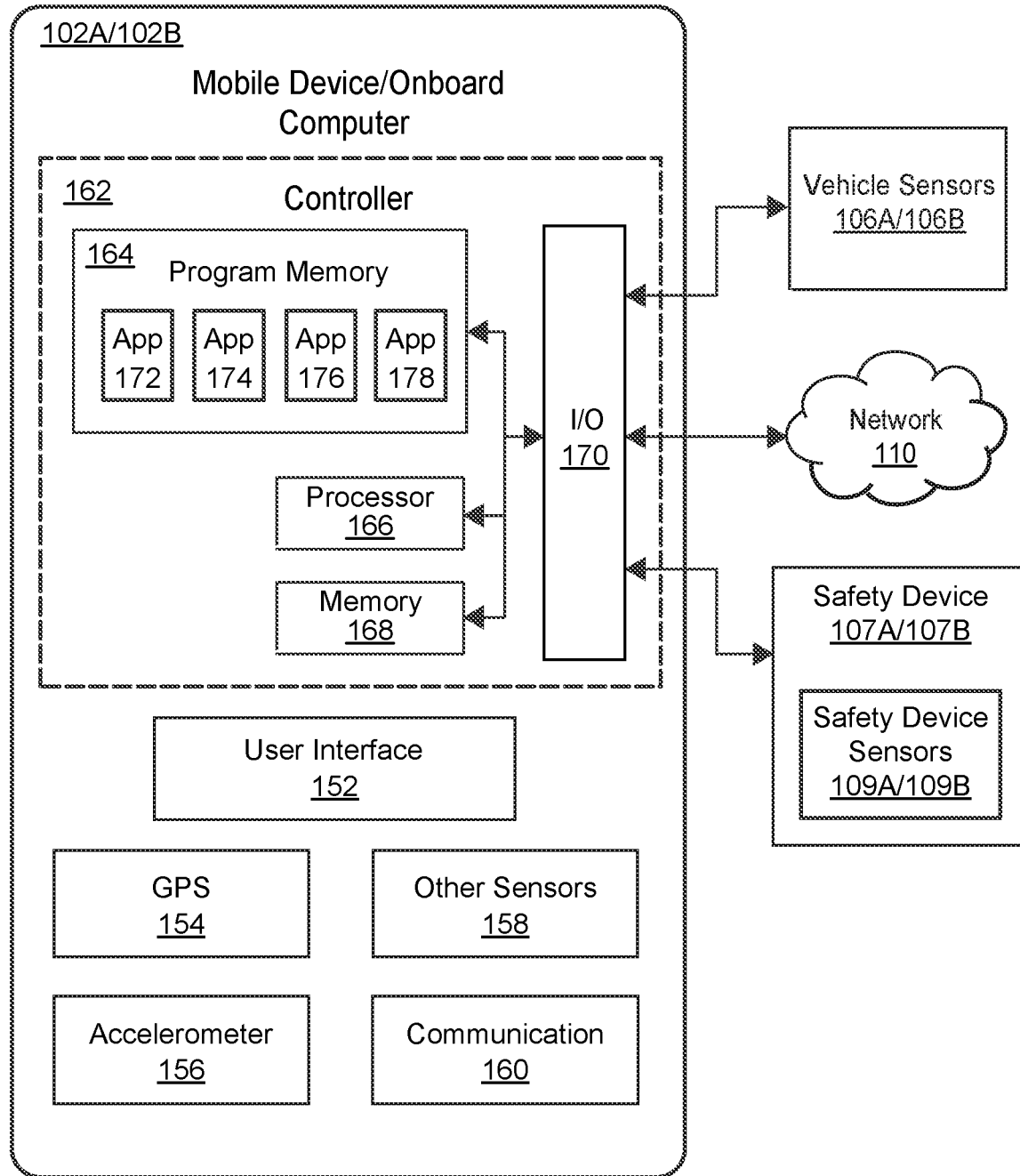
FIG. 1B illustrates an exemplary mobile device and/or onboard computer operable within the system of FIG. 1A, in accordance with some embodiments.

Referring now to FIG. 1B, an exemplary mobile device and/or onboard computer operable within the system of FIG. 1A is illustrated, in accordance with some embodiments. The mobile device and/or onboard computer 102A, 102B may include one or more of a user interface 152, GPS unit 154, an accelerometer 156, one or more other sensors 158, a communication unit 160, and/or a controller 162.

Figure 2C:
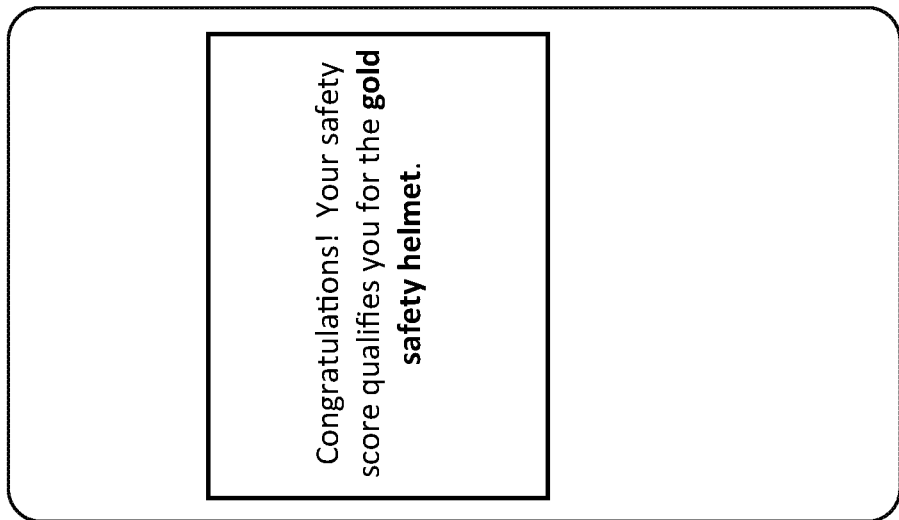
FIGS. 2A-2C illustrate several exemplary user interface displays, in accordance with some embodiments.
Figure 2B:
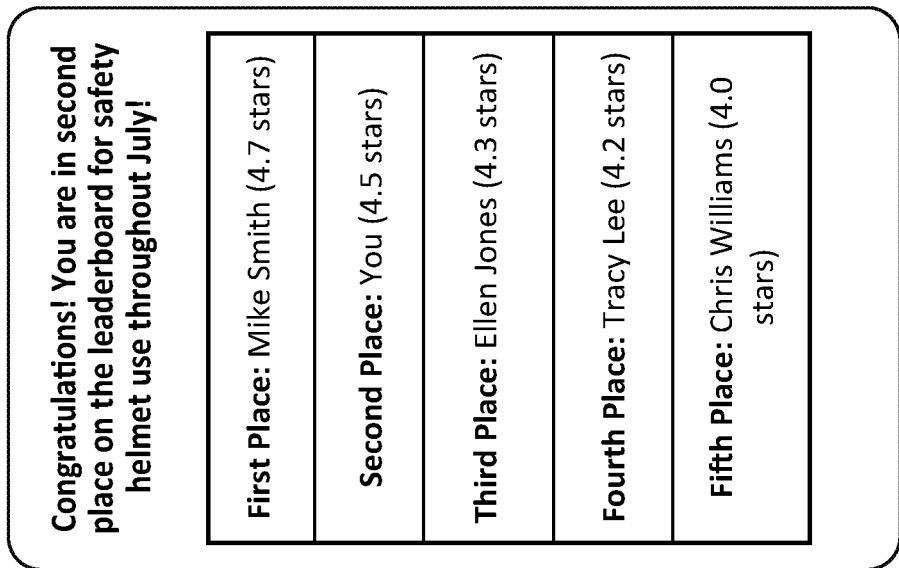
Figure 2A:
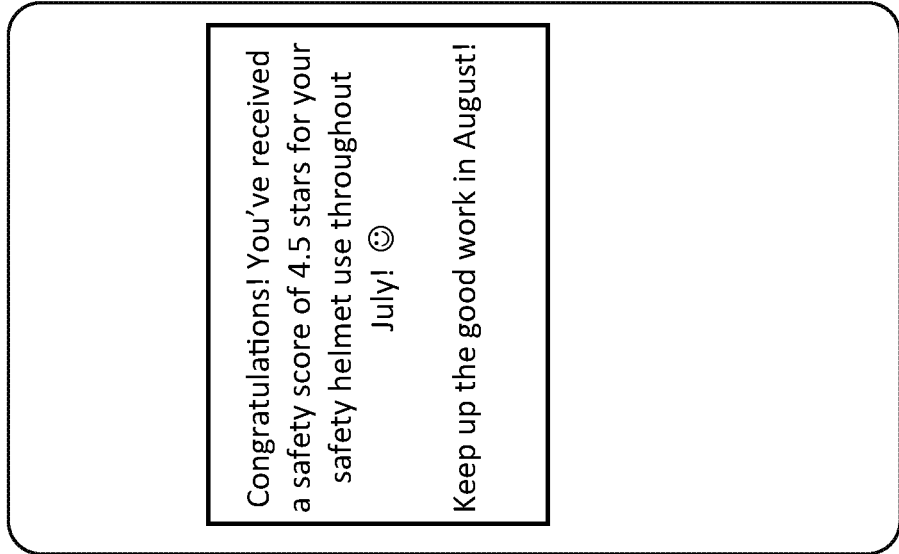

The user interface 152 may be disposed at the mobile device and/or onboard computer 102A, 102B and may display or present information to the vehicle operator. For instance, a user interface may present (e.g., an indication of a safety score based on the vehicle operator's trend of using the safety device while operating the vehicle (as shown in FIG. 2A), an indication of a ranking based on comparing the vehicle operator's trend of using the safety device to other vehicle operators' trends of using the safety device (as shown in FIG. 2B), an indication of a reward the vehicle operator has received based on his or her trend of using the safety device while operating the vehicle (as shown in FIG. 2C), etc. In some instances, the user interface 152 may receive information and/or selections from the vehicle operator. In response to such user selections, the user interface may, for instance, provide additional information and/or notifications.

The GPS unit 154 may be disposed at the mobile device and/or onboard computer 102A, 102B and may collect data indicating the location of the mobile device and/or onboard computer 102A, 102B, and/or (e.g., by proxy) the vehicle 104A, 104B. Moreover, in some embodiments the GPS unit 140 may be a separate device disposed within or external to the vehicle 104A, 104B (e.g., one of the vehicle sensors 106A, 106B), and interfacing with the mobile device and/or onboard computer 102A, 102B. The accelerometer 156 may be disposed at the mobile device and/or onboard computer 102A, 102B and may collect data indicating the acceleration of the mobile device and/or onboard computer 102A, 102B and/or (e.g., by proxy) the vehicle 104A, 104B. Moreover, in some embodiments the GPS unit 156 may be a separate device disposed within or external to the vehicle 104A, 104B (e.g., one of the vehicle sensors 106A, 106B), and interfacing with the mobile device and/or onboard computer 102A, 102B. In general, the GPS unit 154, an accelerometer 156, one or more other sensors 158, and the vehicle sensors 106A, 106B may be configured to capture vehicle telematics data associated with the vehicle 104A, 104B, e.g., one or more of speed data, acceleration data, braking data, cornering data, object range distance data (e.g., following distance data), turn signal data, seatbelt use data, location data, phone use data, date/time data, weather data, road type data, or any other suitable vehicle telematics data. The communication unit 160 may be disposed at the mobile device and/or onboard computer 102A, 102B and may, e.g., transmit and receive information from external sources such as the vehicle sensors 106A, 106B, the server 108, the safety device sensors 109A, 109B, etc., e.g., via the network 110.

As shown in FIG. 1B, the mobile device and/or onboard computer 102A, 102B may include a controller 162, which may include one or more program memories 164, one or more processors 166 (which may be, e.g., microcontrollers and/or microprocessors), one or more memories (which may be, e.g., random-access memories (RAMs)) 168, and an input/output (I/O) circuit 170, all of which may be interconnected via an address/data bus. Although the I/O circuit 170 is shown as a single block, it should be appreciated that the I/O circuit 170 may include a number of different types of I/O circuits. The program memory 164 and RAM 168 may be implemented as semiconductor memories, magnetically readable memories, optically readable memories, or biologically readable memories, for example. Generally speaking, the program memory 164 and/or the RAM 168 may respectively include one or more non-transitory, computer-readable storage media. The controller 162 may also be operatively connected to the network 110 via a link.

The mobile device and/or onboard computer 102A, 102B may further include a number of various software applications 172, 174, 176, 178 stored in the program memory 164. Generally speaking, the applications may perform one or more functions related to, inter alia, transmitting vehicle sensor data and/or safety device sensor data to the server 108, receiving information from the server 108, presenting and/or displaying information from the server 108 to vehicle operators, receiving information from vehicle operators, transmitting the information from the vehicle operators to the server 108, etc. For example, one or more of the applications 172, 174, 176, 178 may perform at least a portion of any of the method 300 shown in FIG. 3. The various software applications 172, 174, 176, 178 may be executed on the same processor 166 or on different processors. Although four software applications 172, 174, 176, 178 are shown in FIG. 1B, it will be understood that there may be any number of software applications 172, 174, 176, 178. Further, two or more of the various applications 172, 174, 176, 178 may be integrated as an integral application, if desired. Additionally, it should be appreciated that in some embodiments, the mobile device and/or onboard computer 102A, 102B may be configured to perform any suitable portion of the processing functions described as being performed by the server 108. Moreover, in some embodiments, one or more processing functions described as being performed by the mobile device and/or onboard computer 102A, 102B may be performed by a computing device (not shown) located on or inside of (or otherwise associated with) a safety device, such as safety device 107A or safety device 107B.

Turning now to FIGS. 2A, 2B, and 2C, several exemplary user interface displays for incentivizing the use of a safety device while operating a vehicle are illustrated, in accordance with some embodiments. For example, the exemplary user interface displays shown in FIGS. 2A, 2B, and/or 2C may be displayed via the user interface 152. As shown in FIG. 2A, a notification may be provided to a vehicle operator. The notification in FIG. 2A indicates that the vehicle operator has received a safety score of 4.5 stars based on a trend of safety helmet use over the course of July. As shown in FIG. 2B, the safety scores of various vehicle operators may be formatted as a competition, and a notification may be provided to a vehicle operator indicating which vehicle operator is currently winning, or which vehicle operator has already won. The notification in FIG. 2B indicates that the vehicle operator is currently in second place in a competition between vehicle operators based on safety helmet use over the course of July. As shown in FIG. 2C, a notification may be provided to a vehicle operator indicating that the vehicle operator has received a reward based on a safety score related to a trend of safety helmet use. The notification in FIG. 2C indicates that the vehicle operator has received a gold safety helmet as a reward for his or her safety helmet use.

Figure 3:
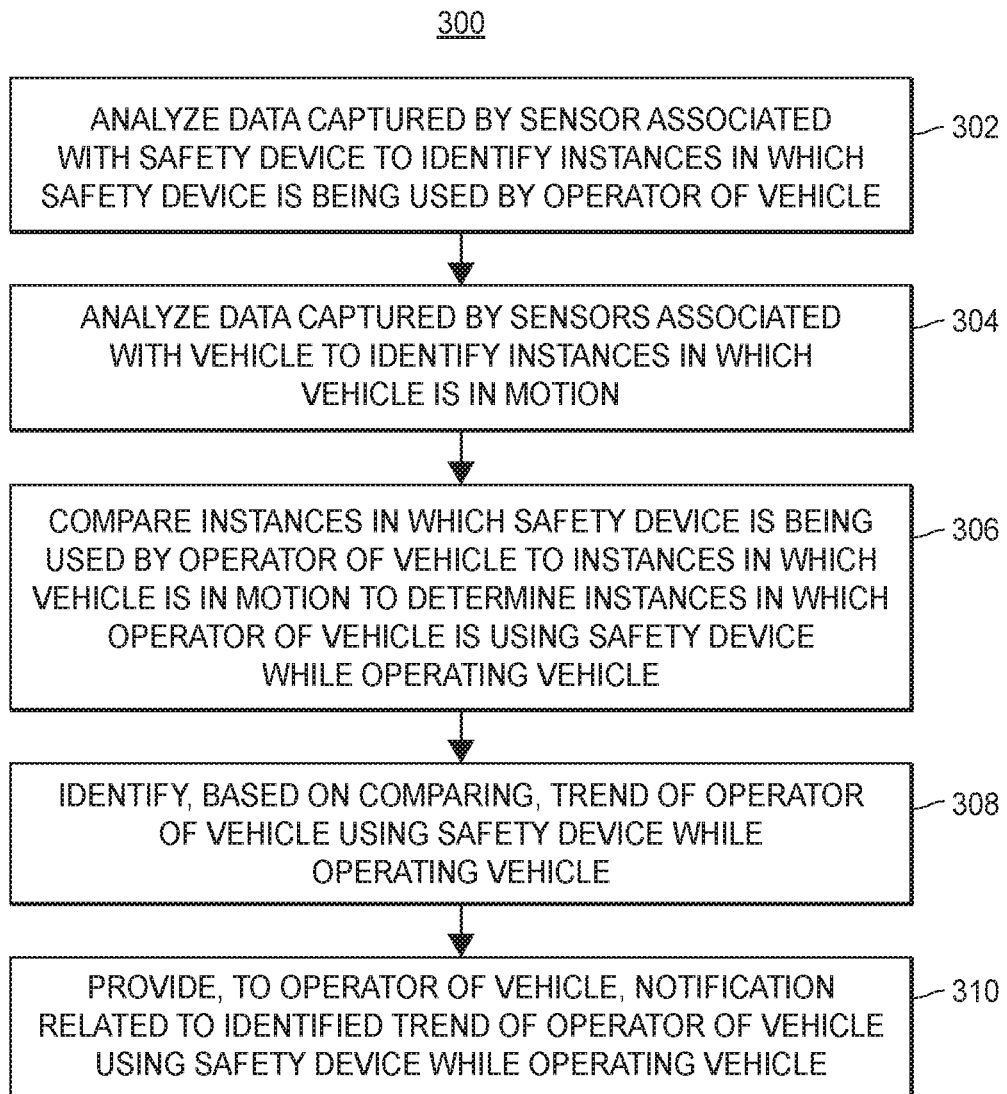
FIG. 3 illustrates a flow diagram of an exemplary computer-implemented method of incentivizing the use of a safety device while operating a vehicle, in accordance with some embodiments.

Turning now to FIG. 3, a flow diagram of an exemplary computer-implemented method 300 of incentivizing the use of a safety device while operating a vehicle is illustrated, in accordance with some embodiments. The method 300 can be implemented as a set of instructions stored on a computer-readable memory and executable on one or more processors.

Data may be captured by one or more sensors associated with a safety device, such as, e.g., a safety helmet, a seat belt, a life jacket, or any other device that improves the safety of a vehicle operator as he or she operates a vehicle. There may be any number of safety device sensors in various embodiments. For example, these safety device sensors may be disposed within the safety device, or attached to the safety device. For instance, sensors may be associated with a safety helmet that is used (e.g., worn) by a vehicle operator as he or she operates a motorized scooter or a motorcycle. As another example, sensors may be attached to a seat belt that is used (e.g., worn) by a vehicle operator as he or she operates a car or a truck. Additionally, sensors may be embedded within a life jacket that is used (e.g., worn) by a vehicle operator as he or she operates a boat or a jet ski. Of course, various embodiments may include additional or alternative safety devices, associated with additional or alternative types of vehicles.

The safety device data may be analyzed (block 302) to identify instances in which the safety device is being used (e.g., worn) by an operator of a vehicle. These detected instances may include time stamps. As one example, data collected by one or more light sensors positioned within the interior of a safety helmet may be analyzed to determine that the safety helmet is being worn. That is, a vehicle operator's head within the safety helmet may block light within the interior of the safety helmet. Accordingly, an instance of the safety device being used by the vehicle operator may be detected when the safety device sensor data indicates that the light is being blocked. As another example, data collected by one or more heat sensors associated with a safety device may be analyzed to determine that the safety device is being worn. That is, a vehicle operator's body heat may be detected by a heat sensor. Accordingly, an instance of the safety device being used by the vehicle operator may be detected when the safety device sensor data indicates that a certain temperature is detected. In some examples, data collected from multiple sensors and/or multiple types of sensors on the safety device may be analyzed to determine that the safety device is being used by the vehicle operator, e.g., as described in the examples above, data from a light sensor may be combined with temperature data to confirm that a vehicle operator is using the safety device. As an additional example, data collected by sensors positioned at two different portions of a safety device may be analyzed to determine that the safety device is being used. For instance, data collected by a sensor positioned at a seat belt buckle and data collected by a sensor positioned at a seat belt tongue may be analyzed to determine that the two sensors are within close proximity of one another, indicating that the vehicle operator is buckled in.

In some instances, the safety device data may be analyzed to identify additional safe behaviors by the vehicle operator using the safety device. For example, the motion of a safety helmet may indicate that the vehicle operator is looking left, right, behind, over the shoulder, etc., when maneuvering. As another example, the tension in a seat belt may indicate that the vehicle operator is moving within the vehicle.

Data may be captured by one or more sensors associated with the vehicle. The data captured by the vehicle sensors may include vehicle telematics data associated with the vehicle such as, e.g., speed data, acceleration data, braking data, cornering data, object range distance data (e.g., following distance data), turn signal data, seatbelt use data, location data, phone use data, date/time data, weather data, road type data, or any other suitable vehicle telematics data. This data may be analyzed (block 304) to identify instances in which the vehicle is in motion. For example, acceleration data or speed data may indicate that the vehicle is in motion. As another example, a change in location, as indicated by location data, may indicate that the vehicle is in motion. These detected instances of the vehicle in motion may include time stamps.

The identified instances in which the safety device is being used by the operator of the vehicle (and/or other additional safe behaviors) may be compared (block 306) to the identified instances in which the vehicle is in motion to determine instances in which the operator of the vehicle is using the safety device while operating the vehicle. For example, time stamps associated with instances in which the safety device is being used by the operator of the vehicle may be compared to time stamps associated with the instances in which the vehicle is in motion. Accordingly, overlapping time stamps may indicate instances in which the operator of the vehicle is using the safety device while operating the vehicle.

Based on the comparison, a trend of the operator of the vehicle wearing the safety device (and/or exhibiting additional safe behaviors) while operating the vehicle may be identified (block 308). For example, the trend of the operator of the vehicle wearing the safety device while operating the vehicle may be identified based on the number of vehicle trips and/or a number of consecutive vehicle trips in which the operator of the vehicle wears the safety device while operating the vehicle (e.g., ten vehicle trips, five consecutive vehicle trips, etc.) As another example, the trend of the operator of the vehicle wearing the safety device while operating the vehicle may be identified based on the frequency of vehicle trips in which the in which the operator of the vehicle wears the safety device while operating the vehicle (e.g., every vehicle trip, one in five vehicle trips, 90% of vehicle trips, etc.) As still another example, the trend of the operator of the vehicle wearing the safety device while operating the vehicle may be identified based on the duration of vehicle operation time during which the operator of the vehicle wears the safety device while operating the vehicle (e.g., ten hours of vehicle operator time, 200 hours of vehicle operation time, etc.) Additionally, as an example, the trend of the operator of the vehicle wearing the safety device while operating the vehicle may be identified based on the distance traveled by a vehicle during which the operator of the vehicle wears the safety device while operating the vehicle (e.g., 100 miles traveled by the vehicle, 200 miles traveled by the vehicle, etc.) Moreover, as another example, the trend of the operator of the vehicle wearing the safety device while operating the vehicle may be identified based on the number of calendar days during which the operator of the vehicle wears the safety device while operating the vehicle (e.g., over 30 calendar days, over 10 calendar days, etc.)

A notification related to the identified trend of the operator of the vehicle wearing the safety device (and/or exhibiting additional safe behaviors) while operating the vehicle may be provided (block 310) to the operator of the vehicle. In some examples, the method may include calculating a safety score associated with the operator of the vehicle (e.g., a score out of a certain number of points such as 80/100, a star rating such as three stars, a grade such as B+, etc.) The safety score may be based, at least in part, on the identified trend of the operator of the vehicle wearing the safety device while operating the vehicle. That is, the vehicle operator may receive a higher score based on wearing the safety device more frequently, more often, on more trips, on more consecutive days, over more calendar days, etc. The notification may include an indication of the vehicle operator's safety score. Accordingly, vehicle operators may be incentivized to use safety devices in order to receive higher safety scores.

Moreover, in some instances, the notification may include an indication of a comparison of the vehicle operator's safety score to the safety scores of other vehicle operators. For example, the notification may indicate whether the vehicle operator has received a better score than the average vehicle operator. Furthermore, in some instances, the safety scores of various vehicle operators may be formatted as a competition, and the notification may indicate whether the vehicle operator is winning. Accordingly, vehicle operators may be incentivized to use safety devices in order to win these competitions.

In some examples, the notification may include an indication that the operator of the vehicle is to receive a reward based on the identified trend of the operator of the vehicle wearing the safety device while operating the vehicle. In some instances, the reward may be a new or updated safety device. For example, by obtaining certain safety scores, or by scoring a certain place in a competition, a vehicle operator may be granted access to an exclusive safety device. For instance, only vehicle operators receiving a four-star safety rating or above may be granted access to (or may receive) a silver safety helmet, while vehicle operators receiving a five-star rating or above may be granted access to (or may receive) a gold safety helmet, etc. As another example, vehicle operators receiving a four-star safety rating or above may be granted access to (or may receive) a customized life jacket. Moreover, in some instances, the reward may be an invitation to a VIP event. As another example, the reward may include access to exclusive portions of a website. As an additional example, the reward may include "unlocking" the ability to rent certain vehicles. For example, only vehicle operators receiving a four-star rating or above may rent a certain model of vehicle. As another example, the reward may include a discount (e.g., from an insurance company, from a third party, etc.). Accordingly, vehicle operators may be incentivized to use safety devices to obtain safety scores required to receive various rewards.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC))

to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for incentivizing usage of safety devices in vehicles, the method comprising:
    analyzing, by one or more processors, first data captured by a safety device sensor of a safety device in a vehicle;
    analyzing, by the one or more processors, second data captured by a sensor to identify instances in which the vehicle is in motion;
    determining, by the one or more processors, a safety score associated with an operator of the vehicle based upon when the safety device is used by the operator of the vehicle while the vehicle is in motion;
    comparing, by the one or more processors, the safety score associated with the operator of the vehicle to one or more safety scores associated with operators of other vehicles to determine a ranking that indicates how the safety score associated with the operator of the vehicle ranks among the one or more safety scores associated with the operators of the other vehicles; and providing, by the one or more processors, a notification to the operator of the vehicle indicating the ranking.

2. The computer-implemented method of claim 1, wherein the safety device is one of a safety helmet, a seat belt, or a life jacket.

3. The computer-implemented method of claim 1, wherein determining the safety score includes determining the safety score based upon one or more of:
   (i) a number of vehicle trips in which the operator of the vehicle uses the safety device while operating the vehicle;
   (ii) a number of consecutive vehicle trips in which the operator of the vehicle uses the safety device while operating the vehicle;
   (iii) a frequency of vehicle trips in which the operator of the vehicle uses the safety device while operating the vehicle;
   (iv) a duration of vehicle operation time during which the operator of the vehicle uses the safety device while operating the vehicle;
   (v) a distance traveled by the vehicle during which the operator of the vehicle uses the safety device while operating the vehicle; or
   (vi) a number of calendar days during which the operator of the vehicle uses the safety device while operating the vehicle.

4. The computer-implemented method of claim 1, wherein analyzing the first data captured by the safety device sensor further comprises analyzing the first data captured by the safety device sensor to determine when the safety device is used by the operator of the vehicle.

5. The computer-implemented method of claim 1, wherein analyzing the second data captured by the sensor to identify instances in which the vehicle is in motion further comprises analyzing the second data captured by the sensor to determine the instances in which the vehicle is in motion, wherein the sensor is associated with the vehicle.

6. The computer-implemented method of claim 1, wherein the notification includes an indication that the operator of the vehicle is to receive a reward.

7. The computer-implemented method of claim 6, wherein the reward is one of a new safety device or an insurance discount.

8. A system for incentivizing usage of safety devices in vehicles, the system comprising:
   one or more processors; and
   one or more memories storing instructions that, when executed by the one or more processors, cause the system to:
      determine a safety score associated with of an operator of a vehicle based upon when a safety device of the safety devices is used by the operator of the vehicle while the vehicle is in motion;
      compare the safety score associated with the operator of the vehicle to one or more safety scores associated with operators of other vehicles to determine a ranking that indicates how the safety score associated with the operator of the vehicle ranks among the one or more safety scores associated with the operators of the other vehicles; and
      provide a notification to the operator of the vehicle indicating the ranking.

9. The system of claim 8, wherein the safety device is one of a safety helmet, a seat belt, or a life jacket.

10. The system of claim 8, wherein the safety score is based upon one or more of:
   (i) a number of vehicle trips in which the operator of the vehicle uses the safety device while operating the vehicle;
   (ii) a number of consecutive vehicle trips in which the operator of the vehicle uses the safety device while operating the vehicle;
   (iii) a frequency of vehicle trips in which the operator of the vehicle uses the safety device while operating the vehicle;
   (iv) a duration of vehicle operation time during which the operator of the vehicle uses the safety device while operating the vehicle;
   (v) a distance traveled by the vehicle during which the operator of the vehicle uses the safety device while operating the vehicle; or
   (vi) a number of calendar days during which the operator of the vehicle uses the safety device while operating the vehicle.

11. The system of claim 8, wherein the instructions, when executed by the one or more processors, further cause the system to analyze first data captured by one or more safety device sensors of the safety device to determine when the safety device is used by the operator of the vehicle.

12. The system of claim 8, wherein the instructions, when executed by the one or more processors, further cause the system to analyze second data captured by one or more sensors associated with the vehicle to identify instances in which the vehicle is in motion.

13. The system of claim 8, wherein the notification includes an indication that the operator of the vehicle is to receive a reward based upon the safety score.

14. The system of claim 13, wherein the reward is one of a new safety device or an insurance discount.

15. A non-transitory computer-readable storage medium having stored thereon a set of instructions for incentivizing usage of safety devices in vehicles, executable by a processor, the instructions comprising instructions for:
   determining a safety score associated with an operator of a vehicle based upon when a safety device of the safety devices is used by the operator of the vehicle while the vehicle is in motion;
   comparing the safety score associated with the operator of the vehicle to one or more safety scores associated with operators of other vehicles to determine a ranking that indicates how the safety score associated with the operator of the vehicle ranks among the one or more safety scores associated with the operators of the other vehicles; and
   providing a notification to the operator of the vehicle indicating the ranking.

16. The non-transitory computer-readable storage medium of claim 15, wherein the safety device is one of a safety helmet, a seat belt, or a life jacket.

17. The non-transitory computer-readable storage medium of claim 15, wherein the safety score is determined based upon one or more of:
   (i) a number of vehicle trips in which the operator of the vehicle uses the safety device while operating the vehicle;
   (ii) a number of consecutive vehicle trips in which the operator of the vehicle uses the safety device while operating the vehicle;

(iii) a frequency of vehicle trips in which the operator of the vehicle uses the safety device while operating the vehicle;

(iv) a duration of vehicle operation time during which the operator of the vehicle uses the safety device while operating the vehicle;

(v) a distance traveled by the vehicle during which the operator of the vehicle uses the safety device while operating the vehicle; or (vi) a number of calendar days during which the operator of the vehicle uses the safety device while operating the vehicle.

18. The non-transitory computer-readable storage medium of claim 15, wherein the instructions further comprise instructions for analyzing first data captured by one or more sensors of the safety device to determine when the safety device is used by the operator of the vehicle.

19. The non-transitory computer-readable storage medium of claim 15, wherein the instructions further comprise instructions for analyzing second data captured by one or more sensors associated with the vehicle to identify instances in which the vehicle is in motion.

20. The non-transitory computer-readable storage medium of claim 15, wherein the notification includes an indication that the operator of the vehicle is to receive a reward based upon the safety score.

21. A system for incentivizing usage of safety devices in vehicles, the system comprising:

means to determine a safety score associated with of an operator of a vehicle based upon when a safety device of the safety devices is used by the operator of the vehicle while the vehicle is in motion;

means to compare the safety score associated with the operator of the vehicle to one or more safety scores associated with operators of other vehicles to determine a ranking that indicates how the safety score associated with the operator of the vehicle ranks among the one or more safety scores associated with the operators of the other vehicles; and means to provide a notification to the operator of the vehicle indicating the ranking.

\* \* \* \* \*